United States Patent [19]
Cozzolino et al.

[11] Patent Number: 5,860,547
[45] Date of Patent: Jan. 19, 1999

[54] OPEN TOP CONTAINER SWINGING ROOF BOW

[75] Inventors: Massimo Cozzolino; Giacomo Cocino, both of Genova, Italy

[73] Assignee: Studio Di Consulenza Technica, Genova, Italy

[21] Appl. No.: 729,389

[22] Filed: Oct. 11, 1996

[30] Foreign Application Priority Data

Oct. 19, 1995 [IT] Italy ................................ GE950051 U

[51] Int. Cl.$^6$ ........................................................ B60P 7/00
[52] U.S. Cl. ................ 220/1.5; 296/100.17; 296/100.18; 105/377.02
[58] Field of Search ........................ 220/1.5; 296/100.17, 296/100.18; 105/377.02

[56] References Cited

U.S. PATENT DOCUMENTS

| | | | |
|---|---|---|---|
| 3,066,974 | 12/1962 | Ambli | 296/100.17 |
| 4,854,633 | 8/1989 | Kraft et al. | 105/377.02 X |
| 4,915,439 | 4/1990 | Cramaro | 296/100.18 X |
| 5,487,584 | 1/1996 | Jespersen | 296/100.18 |
| 5,664,824 | 9/1997 | Stephens et al. | 296/100.17 |

*Primary Examiner*—Steven M. Pollard
*Attorney, Agent, or Firm*—Graham & James LLP

[57] ABSTRACT

A roof bow for an open top container, which comprises a first end pin which extends from a first end of said roof bow, wherein said first end pin is insertable into a hole of a first container wall bracket, a second end pin which extends from a second end of said roof bow, wherein said second end pin is insertable into a hole of a second container wall bracket, and a pin for securing said roof bow to said open top container. The second pin has a length which is greater than the length of said first end pin, and further, the second end pin has a hole at a lower portion thereof for receiving said securing pin.

17 Claims, 4 Drawing Sheets

OPEN TOP CONTAINER SWINGING ROOF BOW

BACKGROUND OF THE INVENTION

As is known, the transportation of goods can be accomplished by dry freight containers or by open top containers and, in this case, it is necessary to fit them with proper tarpaulins in order to protect the cargo from inclement weather and from pilferages. Generally, the tarpaulins are laid and are supported, for a better positioning, by a certain number of bows, normally fitted in a transverse manner of the container, fixed by proper ropes and hooked to the container side walls.

The above mentioned bows act, as well as reinforcings, to give more strength to the container side walls.

Nowadays, the above mentioned bows, properly shaped, have at both ends a pin looking downwards that is then fitted in a properly shaped or "C" shaped bracket which is welded in the inner part of the top side rails. The mounting and dismounting of the bows is simply done by fitting and pulling out the pins into and from the said brackets.

The major problem of the actual roof bows is that, during the loading and unloading of the container, they must be removed, and generally positioned on the ground nearby the same container. Consequently, the bows can be lost or stolen with obvious difficulties in the preparation of the container for the shipment.

SUMMARY OF THE INVENTION

The aim of this invention is to eliminate the aforementioned inconvenience, by arranging the bows to be not removable, but fixed, on one side, to the container, and to be opportunely swung to allow the loading and unloading operations.

Consequently, the roof bows are, in this way, an integral part of the container, without the possibility of losses or thefts.

In fact, according to the invention, one of the ends of the bow is shaped into a longer pin, rotating inside a bracket, in such a way that the same bow can be lifted to release the pin at the opposite end, keeping, at the same time, the first pin into the bracket, and then, the roof bow can swing laterally and come to rest on the top side rail.

As will be further described, the roof bows, shaped according to the invention, can be obtained, from a new production or from a modification of the existing ones, by appropriately changing one of the ends according to the invented device.

As, generally, the distance between the top side rails of the open top containers, produced in different factories, are not the same, this patent also proposes the solution to adjust the roof bows according to the distances between the top side rails, avoiding the manufacturing of roof bows with different measures.

In this way, it will be possible to manufacture, in series, roof bows also in plastic, suitable for all different types of open top containers.

The subject of the invention, can be utilized with all different types of containers like, truck body, railcar body, swap body, and specifically, for the containers for sea and land transport commonly called "open top containers".

The invention is hereby described and illustrated on the attached drawings.

DESCRIPTION OF THE PREFERRED EMBODIMENT

Figure 1:
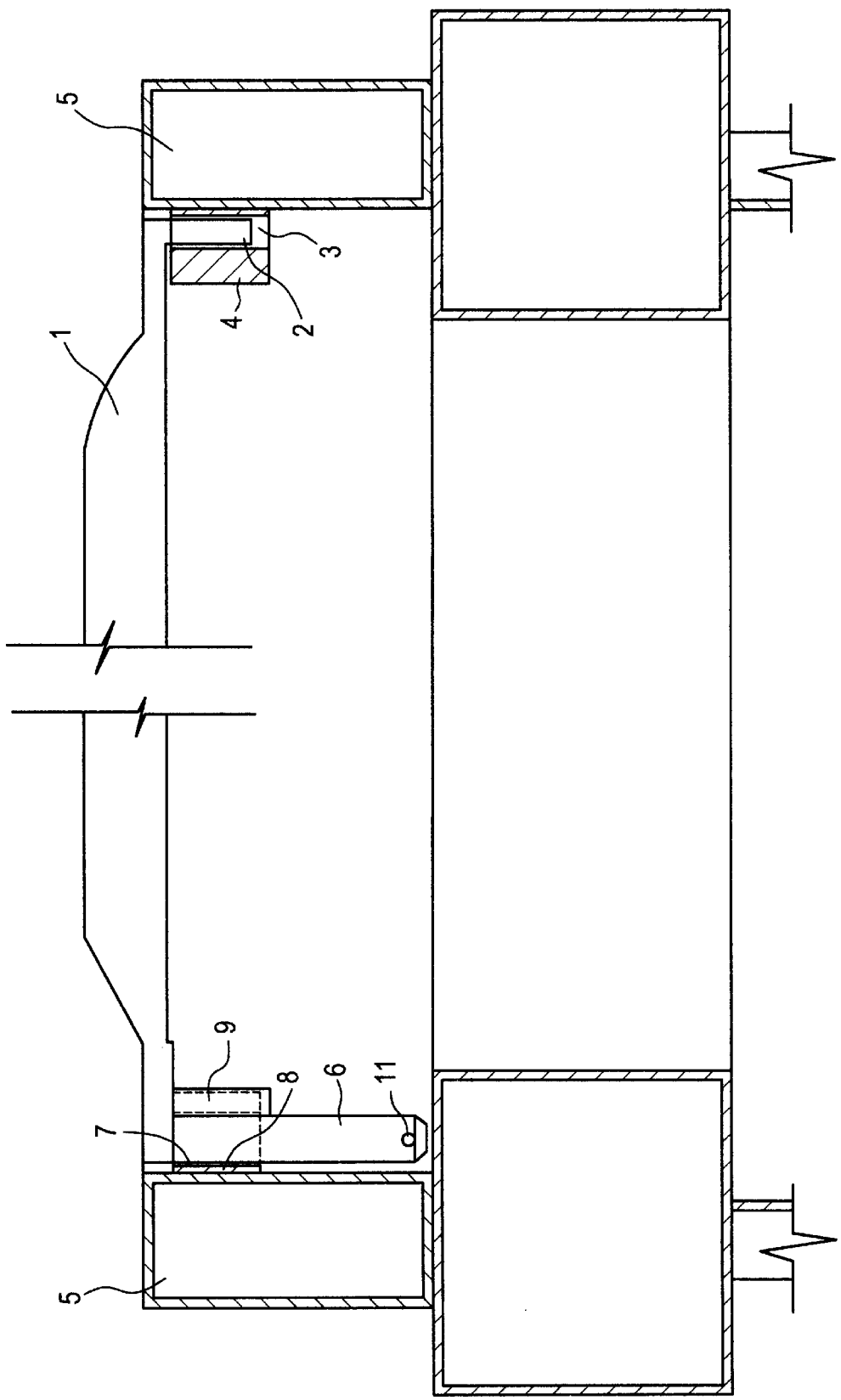
FIG. 1 shows the lateral view of the new invented roof bow, positioned between the top side rails.
Figure 2:
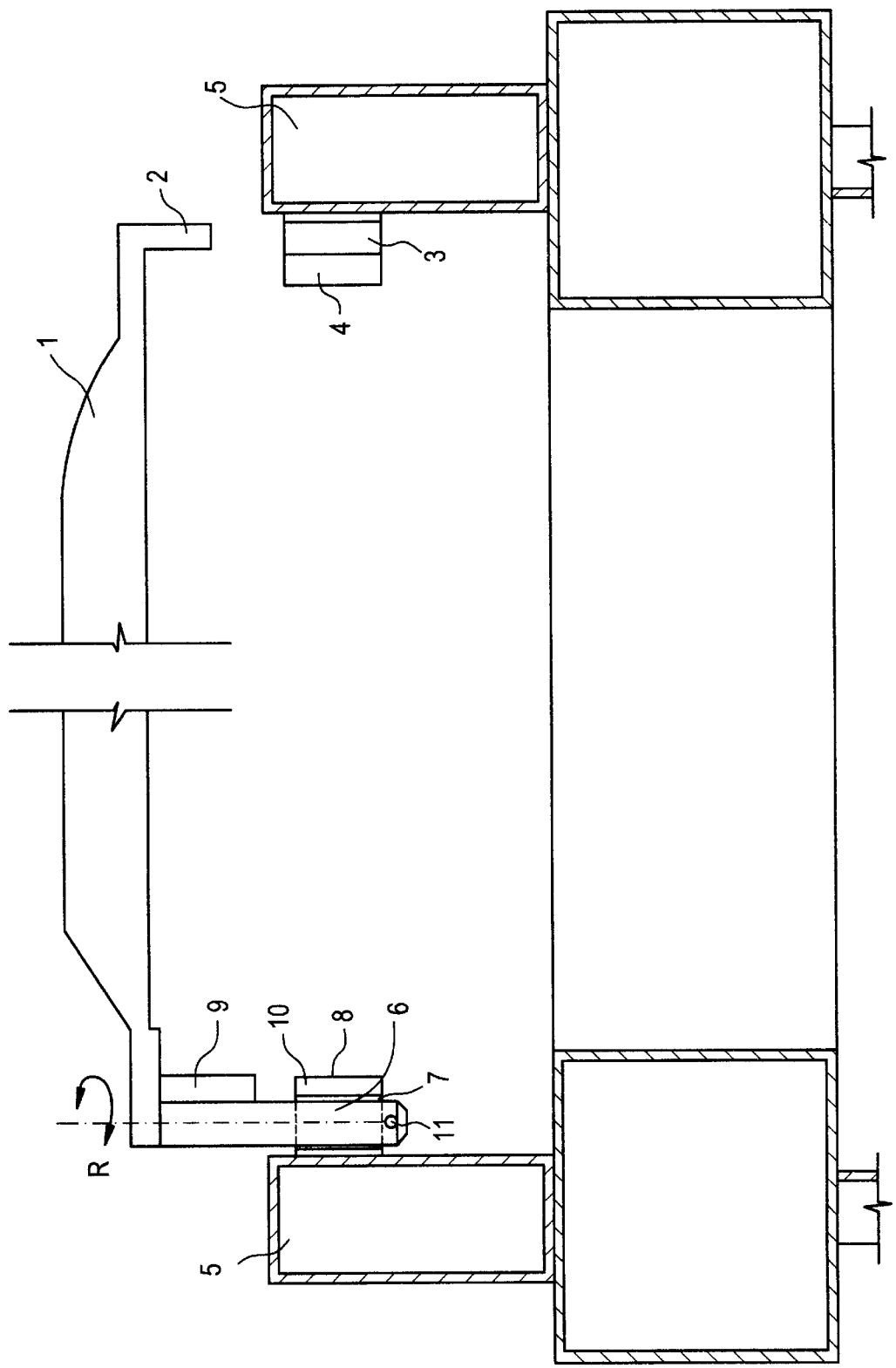
FIG. 2 shows the roof bow of FIG. 1 lifted and ready to swing.
Figure 3:
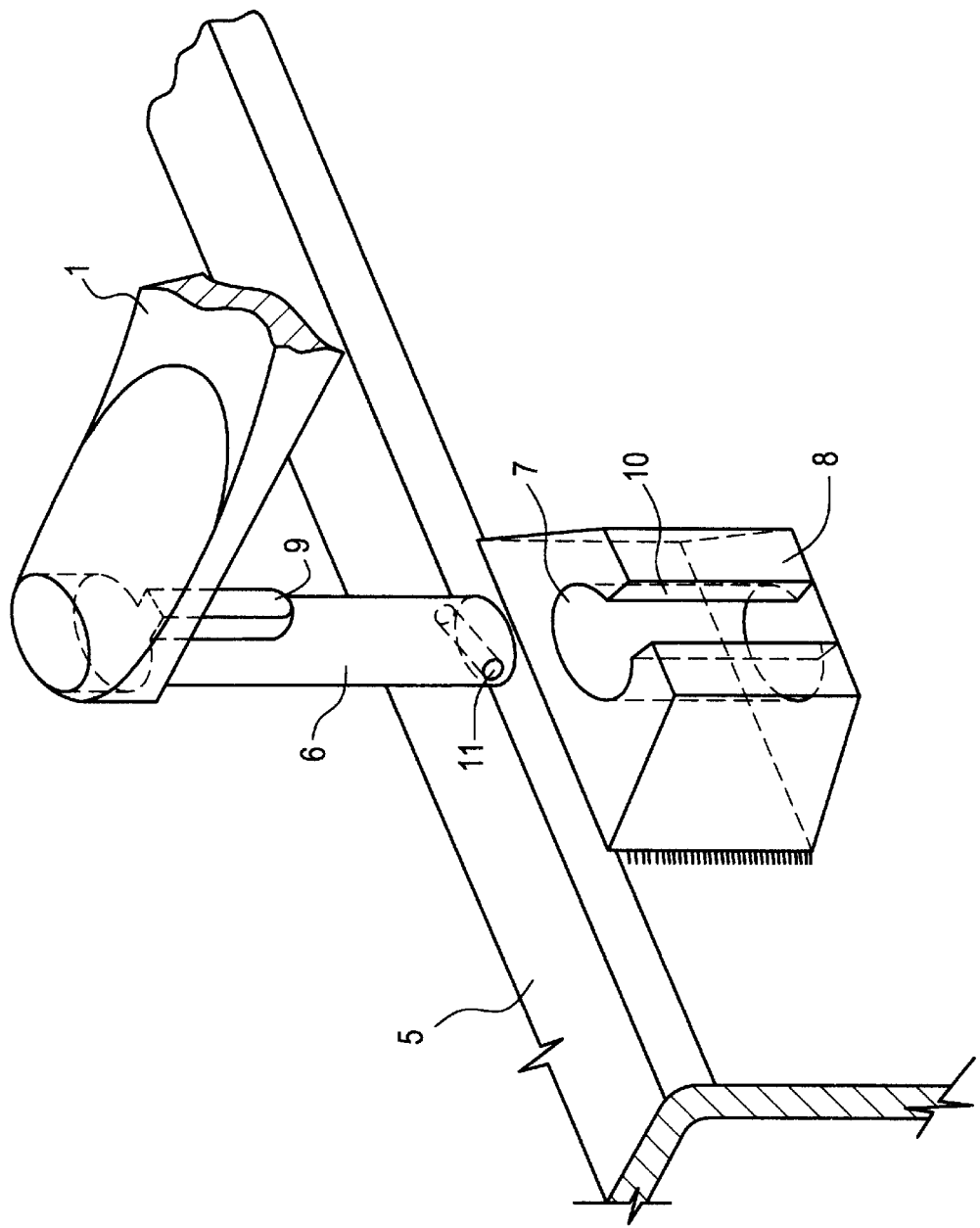
FIG. 3 shows the enlarged perspective view of the fixing pin at one end of the bow.

With reference to the FIGS. 1 to 3, in FIG. 1 is shown the roof bow with at one end, the end 2 in the right part of FIGS. 1 and 2, which is a pin, looking downwards, which is fixed into a bracket or "C" section bracket, that is attached in the inner part of the top side rail 5 of the container.

The end 2 is the one generally used for the open top containers roof bows.

The opposite end of the bow 1 has a longer and different shaped pin 6, looking downwards, rigidly connected to the same bow, which is fixed into the hole 7 of the bracket 8 which is attached to the top side rail 5.

In the inner part of the mentioned pin 6, is provided a smaller pin 9, while on the bracket 8 it is foreseen a cleft 10, in correspondence of the small pin 9.

In the lower part of pin 6, is provided a hole 11 for a security pin, to prevent the pin 6 from coming completely out from the hole 7 when the roof bow is pulled up. This solution, with the security pin, can be replaced by any other fixing means fitted at the lower end of the pin 6.

From the foregoing, it is clear that the assembly of the bow 1 on the container, is done fitting the pin of the end 2 into the hole 3 of the bracket 4 and fitting the pin 6 into the hole 7 of the left bracket 8.

The pin 6 is then fixed by the device 11 to prevent the roof bow from completely coming out when pulled up. In the normal fitting conditions, the smaller pin 9 goes into the cleft 10 of the bracket 8.

In these conditions, the roof bow 1 is firmly fixed as per FIG. 1 and the tarpaulin can be fitted on. To load and unload the container, the roof bows must be removed from their position to clear up the roof aperture and, for this reason, they are lifted, as per FIG. 2, releasing the pin of end 2 from the bracket 4 and pulling out the smaller pin 9 from the cleft 10. Meanwhile, the pin 6 remains partially kept in the relevant bracket 8. Therefore, the whole roof bow can be swung as per direction R, and laid on top of the left top side rail 5.

The main function of the small pin 9 is to act as a support for the bow, when pulled up from the cleft 10, resting on the top surface of the bracket 8, in order to help the roof bow during swinging, and avoiding that the same is lowered in such a way as to lay the bow easily on the top of the side top rail 5.

To refit the roof bows on the container, the above mentioned operations shall be executed in the opposite sequence.

Figure 4:
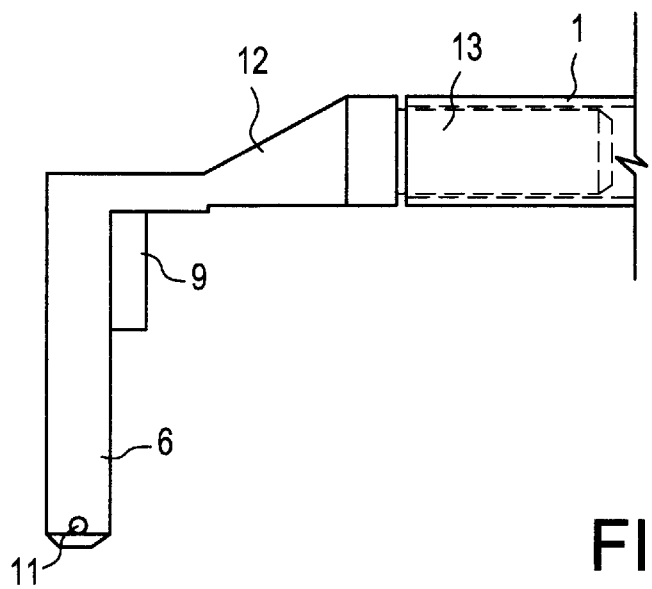
FIG. 4 shows the solution, according to the invention, in case of modification of the roof bows, already manufactured.

As today, the roof bows are manufactured by a steel commercial tube properly pressed and bent to act like pins at both ends, it is possible to modify the commonly used bows as per the concept of the invention, cutting, as per FIG. 4, the bow 1 near the end to be modified, according to the invention, and manufacturing a modified end composed by a specially shaped pressed part 12, a pin 6 and a connecting part 13 to be fitted inside, and fixed into, the bow 1.

Figure 5:
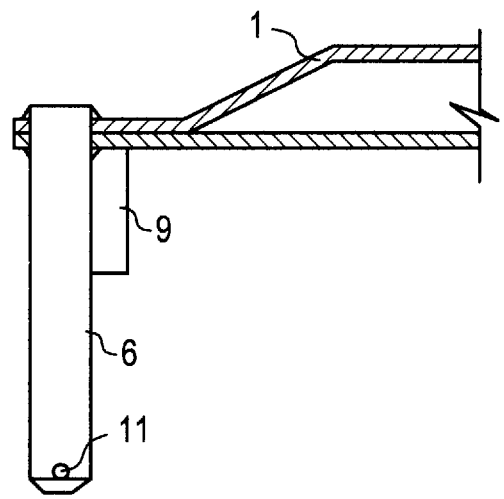
FIG. 5 shows the solution in case of new production of the roof bow.

Obviously, the new roof bows, relating to the invention, can be manufactured in steel according to FIG. 4 or, in other ways, as per FIG. 5, or in proper plastic material.

In the solution shown in FIG. 5, the roof bow 1, manufactured as known by a steel tube with the ends pressed, has one end bent to act like a pin. Meanwhile the other end is provided with another pin 6 equipped with a relevant properly fixed smaller pin 9.

Figure 6:
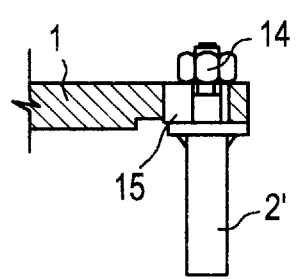
FIGS. 6 and 7 show the end of the roof bow opposite to the one of the rotating pin equipped with the length adjustment device.
Figure 7:
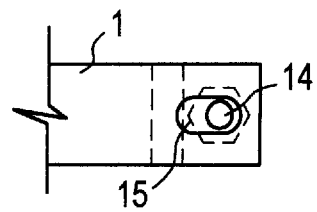

To make manufacturing easier and to make the roof bows adaptable to every type of open top container, including containers having different inside width dimensions between the top side rails, subordinately according to the invention, it is possible to manufacture the end for the normal fitting, shown on the right side of FIGS. 1 and 2, adjustably arranging the pin 2' of FIG. 6 that must be fitted into the bracket 4, adjustable according to the length of the bow by means of a bolt 14, and movable inside the longitudinal aperture 15, as shown in FIGS. 6 and 7.

Any other known solution can be used to adjust the length of the roof bows to the actual distance between the top side rails of the various type of containers.

Therefore, according to the invention, it is foreseen the possibility to load and unload the open top containers without the need to remove the roof bows, which are laterally swung, without the possibility of losses or thefts of same. This solution represents also an advantage because the roof bows become an integral part of the container and, therefore, covered by insurance.

Naturally, the roof bows, according to the invention, can be utilized with whatever type of container, either for road or railway transport or, more particulary, for the containers commonly called open top containers.

Obviously the above described invention, according to the law and without limitation, can be modified and changed according to the various needs, replacing the components with similar ones having the same function, always remaining within the limits of the invention.

We claim:

1. A roof bow for an open top container, which comprises:
    a first end pin which extends from a first end of said roof bow, wherein said first end pin is insertable into a hole of a first container wall bracket;
    a second end pin which extends from a second end of said roof bow, wherein said second end pin is insertable into a hole of a second container wall bracket; and
    a pin for securing said roof bow to said open top container,
    wherein said second end pin has a length which is greater than the length of said first end pin, and further wherein said second end pin has a hole at a lower portion thereof for receiving said securing pin.

2. The roof bow of claim 1, which further comprises:
    a third end pin which extends from said second end of said roof bow, wherein said third end pin is insertable into a cleft of said second container wall bracket.

3. The roof bow of claim 2, wherein said third end pin has a length which is shorter than the length of said second end pin.

4. The roof bow of claim 2, wherein said roof bow is displaceable in a vertical direction to a location whereat said first end pin is removed from said first container wall bracket, and wherein said roof bow is rotatable relative to said open top container about said second end pin, and further wherein said second end pin is secured within said second container wall bracket, and further wherein said roof bow is supported by said third end pin on said second container wall bracket.

5. The roof bow of claim 1, wherein said second end pin is rotatably retained within said hole of said second container wall bracket by said securing pin.

6. The roof bow of claim 1, wherein said roof bow is manufactured from at least one of steel and plastic.

7. The roof bow of claim 1, wherein said roof bow is manufactured from tubular material.

8. The roof bow of claim 1, which further comprises:
    a bracket which extends from said first end of said roof bow, wherein said bracket has a longitudinal aperture which is larger in diameter than said first end pin diameter, and further wherein the position of said first end pin is adjustable within said longitudinal aperture.

9. The roof bow of claim 8, which further comprises:
    a bolt for securing said first end pin to said bracket.

10. The roof bow of claim 1, wherein said roof bow is an integral component of said open top container.

11. The roof bow of claim 1, wherein said roof bow is displaceable in a vertical direction to a location whereat said first end pin is removed from said first container wall bracket, and further wherein said roof bow is rotatable relative to said open top container about said second end pin, and further wherein said second end pin is secured within said second container wall bracket.

12. The roof bow of claim 1, wherein said second end pin is rotatable in the hole of said second container wall bracket.

13. The roof bow of claim 1, wherein said roof bow is manufactured as on of a single integrated unit and assembled from a plurality of components.

14. The roof bow of claim 1, wherein the open top container is one of a truck body container, a railcar body container, a swap body container, a sea vessel container and a land transport vessel container.

15. A roof bow for an open top container, which comprises:
    a first end pin which extends from a first end of said roof bow, wherein said first end pin is removably insertable into a hole of a first container wall bracket;
    a second end pin which extends from a second end of said roof bow, wherein said second end pin is rotatably secured within a hole of a second container wall bracket, wherein said second end pin has a length which is greater than the length of said first end pin; and
    a third end pin which extends from said second end of said roof bow, wherein said third end pin is located adjacent to said second end pin, and further wherein said third end pin has a length which is less that the length of said second end pin, and further wherein said third end pin is removably insertable into a cleft of said second container wall bracket,
    wherein said roof bow is vertically displaceable to a location whereat said first end pin is removed from said hole of said first container wall bracket, and whereat said third end pin is removed from said cleft of said second container wall bracket, and further wherein said roof bow is rotatable about said second end pin.

16. The roof bow of claim 15, wherein said roof bow is supportable by said third end pin.

17. The roof bow of claim 15, wherein the position of said first end pin is adjustable.

* * * * *